United States Patent Office 3,259,602
Patented July 5, 1966

3,259,602
RUBBERY INTERPOLYMER OF BUTADIENE AND STYRENE PLASTICIZED WITH A SOLVENT EXTRACTED MINERAL OIL RAFFINATE
Archie B. Hoel, Cherry Hill, N.J., assignor to Sun Oil Company, Philadelphia, Pa., a corporation of New Jersey
No Drawing. Continuation of application Ser. No. 409,510, Feb. 10, 1954. This application Aug. 25, 1964, Ser. No. 392,019
5 Claims. (Cl. 260—33.6)

This application is a continuation of application Serial No. 409,510 filed February 10, 1954, by the present applicant, and now abandoned.

This invention relates to improved synthetic rubber compositions.

It is known in the art to employ mineral oil as a plasticizer or extender for rubbery materials such as butadiene polymers and interpolymers, etc., and such oils generally impart highly satisfactory properties to the rubbery material in question. However, rubbery materials plasticized with mineral oil plasticizers of the prior art exhibit a disadvantageous tendency to stain materials adjacent to the rubbery material. Furthermore, in the case of light-colored rubber products, e.g. white-sidewall tires for automobiles, footwear, etc. rubbery materials plasticized with prior art mineral oil plasticizers show a disadvantageously poor color stability.

The present invention provides a novel rubbery composition containing mineral oil as plasticizer or extender and having excellent color stability and non-staining properties. According to the present invention, compositions are provided which comprise rubbery material and a mineral oil from which a portion of the compounds containing aromatic nuclei has been removed, the oil containing, after such removal, at least 10 weight percent, and preferably at least 25 weight percent, of aromatic compounds, i.e. compounds containing an aromatic ring or rings. Generally, the oil contains, after such removal, not more than about 45 weight percent of aromatic compounds. According to the invention, the aromatic content can be reduced to the desired level by any suitable means, e.g. by extraction with a selective solvent for aromatics. Thus, for example, the aromatic content may be reduced from about 45 percent to about 35 percent by extraction with a selective solvent for aromatics, e.g. furfural. Any of the well-known selective solvents for aromatics can be employed, e.g. furfural, phenol, sulfur dioxide, nitrobenzen, B,B'-dichloroethyl ether, etc. Other suitable extraction means can be employed.

The amount of aromatic compounds removed according to the present invention is preferably in the range from 10 to 60 weight percent, and more preferably in the range from 25 to 40 weight percent, of the aromatics originally present. Thus, for example, if the oil prior to solvent extraction contains 46.4 percent aromatics, and the oil after solvent extraction contains 37.1 percent aromatics, the amount of aromatics removed is about 32 percent of the aromatics originally present, assuming for the purpose of approximation that only aromatics are removed in the solvent extraction.

The mineral oil whose aromatic content has been reduced, and which contains at least 10 percent of aromatic compounds, has been found to be highly satisfactory for use as a processing oil in the preparation of rubber compositions, particularly in compositions where non-staining properties are important. The oil is compatible with rubber in amounts sufficient to provide the desired plasticization in many applications of oil-plasticized rubbers.

A particularly advantageous use of the oil in question is in GR–S white rubber formulations. Such formulations are in general known in the art and may contain a butadiene-styrene interpolymer prepared by special known methods to obtain properties suitable for preparation of white rubber stocks. The white rubber formulas also generally contain a minor amount, e.g. 25 parts by weight per 100 of polymer, of a material, e.g. titanium dioxide, imparting a white color to the compounded rubber. Other known rubber compounding ingredients may be present, such as fillers, vulcanizing agents, accelerators, etc. According to the present invention, a mineral oil from which aromatics have been removed as specified may be employed in such white rubber formulations, employing from 5 to 50 parts by weight of oil per 100 parts of GR–S.

The mineral oil employed according to the invention generally has S.U. viscosity at 100° F. of at least 100 seconds. Normally liquid mineral oil fractions having considerably higher viscosities, e.g. up to 300 S.U.S. at 210° F. or higher, can also be employed.

The following example illustrates the invention:

*Example 1*

A furfural-refined naphthenic-base mineral oil was employed as plasticizer in a white GR–S rubber formulation. The oil was a blend of 20 parts by volume of a clay treated, 85% raffinate from a relatively light distillate, and 80 parts by volume of a clay treated, 85% raffinate from a relatively heavy distillate. The blend had the following properties: S.U. viscosity at 100° F. of 1853 seconds, S.U. viscosity at 210° F. of 90.5 seconds, A.P.I. gravity at 60° F. of 21.5, average molecular weight of 465, and aromatics content of 37.1 weight percent.

The mineral oil prepared as desired above was used as plasticizer in the preparation of the following white rubber composition:

| Component: | Parts by weight |
|---|---|
| Butadiene-styrene interpolymer ("GR–S 66 Special") | 100 |
| Zinc oxide ("Kadox–15") | 60 |
| N-cyclohexyl-2-benzothiazylsulfonamide ("Santocure") | 1 |
| Calcium carbonate ("Atomite") | 15 |
| Titanium dioxide ("Rayox") | 25 |
| Zinc laurate ("Laurex") | 1 |
| Sulfur | 1.75 |
| Mineral Oil | 20 |

The color stability of the compounded rubber was tested by mounting a sample on a board and exposing it on the roof of a building for eighteen days. At the end of this period, only slight discoloration of the sample was visible. By way of comparison, the same formulation employing a commercial mineral oil plasticizer for GR–S, which plasticizer has not been solvent extracted and contains about 47% aromatics, in place of the mineral oil according to the invention, exhibited a definite and considerably greater discoloration when subjected to the same test.

This example shows that mineral oil which has been extracted with furfural to obtain an 85% raffinate containing about 37% aromatics is compatible, in 20 parts per 100 of polymer, to produce a white GR–S rubber product having definite superiority to a white rubber product containing a commercial mineral oil plasticizer for GR–S.

Rubbery materials which can be compounded with mineral oils according to the invention include synthetic rubber-like copolymers of butadiene with a vinyl monomer, i.e. a monomer containing the group $CH_2=CH-$, e.g. styrene, acrylonitrile, vinyl chloride, acrylic acid, acrolein, vinyl ethyl ether, vinyl acetylene, etc.

In the oil used in the preceding example, about 13 percent of the carbon atoms were aromatic carbon atoms, about 37 percent were naphthenic carbon atoms, and about 50 percent were paraffinic carbon atoms, as determined by the n-d-M carbon-type analysis disclosed in the book, Aspects of the Constitution of Mineral Oils, by Van Nes and Van Westen (1951) at page 335 et seq. Thus, the ratios of aromatic to paraffinic carbon atoms and of naphthenic to paraffinic carbon atoms in the oil were about 0.26 and 0.74 respectively. Preferably, an oil used according to the invention contains ratios of aromatic to paraffinic and of naphthenic to paraffinic carbon atoms of at least 0.08 and at least 0.67 respectively. Generally the ratios of aromatic and naphthenic carbon atoms to paraffinic carbon atoms will not exceed 0.35 and 1.2 respectively, though higher ratios can be used.

The mineral oil employed according to the invention can be used as a plasticizer for ordinary synthetic rubber polymers, or as an extender for a high Mooney viscosity synthetic rubber polymer. In ordinary polymer composition, generally the amount of oil used will be in the approximate range from 5 to 50 parts by weight of oil per 100 parts of polymer. In the extended polymer compositions, where the Mooney (ML–4) viscosity of the polymer prior to addition of any extender, is generally within the approximate range from 80 to 240, the amount of oil used will generally be in the approximate range from 10 to 120 parts of oil per 100 parts of polymer, and preferably in the range from 20 to 80 parts of oil per 100 parts of polymer.

The invention claimed is:

1. A rubber composition having excellent color stability and non-staining properties comprising (1) a rubbery interpolymer of butadiene and styrene and (2) a plasticizing amount of mineral oil raffinate from solvent extraction, which raffinate (a) has been obtained by removing aromatic compounds from mineral oil by extraction with a selective solvent for aromatic compounds, (b) contains 10 to 45 weight percent of aromatic compounds, and (c) is completely compatible with said interpolymer in said plasticizing amount.

2. Composition according to claim 1 wherein said raffinate has Saybolt Universal viscosity in the range from 100 seconds at 100° F. to 300 seconds at 210° F., and contains 0.8 to 0.35 aromatic carbon atom and 0.67 to 1.2 naphthenic carbon atoms for each paraffinic carbon atom therein.

3. Composition according to claim 1 wherein said mineral oil is naphthenic.

4. Composition according to claim 1 wherein said raffinate contains 25 to 45 percent aromatic compounds.

5. Composition according to claim 1 wherein a white pigment is present.

References Cited by the Examiner

UNITED STATES PATENTS

| 2,415,541 | 2/1947 | Soday. |
| 2,681,898 | 6/1954 | Daly _____ 260—41.5 |
| 2,964,083 | 12/1960 | Pfau et al. |

FOREIGN PATENTS

| 459,595 | 1/1937 | Great Britain. |

OTHER REFERENCES

Swart et al., "India Rubber World," volume 124, No. 3, June 1951, pages 309–319.

Rostler et al., "Industrial and Engineering Chemistry," vol. 41, No. 3, March 1949, pages 598–608.

MORRIS LIEBMAN, *Primary Examiner.*

A. LIEBERMAN, *Assistant Examiner.*